June 20, 1939.  J. R. GEHR  2,163,030

FLOATING GEAR MOUNTING

Filed Oct. 14, 1935

INVENTOR.
John R Gehr
BY Myron J Dikeman
ATTORNEY.

Patented June 20, 1939

2,163,030

UNITED STATES PATENT OFFICE 2,163,030

FLOATING GEAR MOUNTING

John R. Gehr, Detroit, Mich., assignor to Louis J. Eppinger, Detroit, Mich.

Application October 14, 1935, Serial No. 44,887

4 Claims. (Cl. 242—84.7)

The object of my invention is to produce a floating gear mounting for a fishing reel head to provide for free spinning of a chosen gear within a special gear assembly.

A further object is to provide a floating rotary mounting for a fishing reel assembly that will afford free rotation of a chosen gear of an assembled group mounted on the same shaft adjacent to each other and subjected to aximetrically applied spring pressure.

A still further object is to produce a floating gear mounting that is simple in construction, easily and efficiently operated and that can be manufactured at a very low cost.

These several objects are attained in the preferred form by the construction and arrangement of parts more fully hereinafter set forth.

Similar parts on all drawings are marked by similar numerals or letters.

My invention is specially applied to the main drive gear of a fishing reel, said gear having a special disc locking unit mounted therein which is subjected to axially applied spring pressure, my floating gear mounting being designed to relieve the drive gear of the lock spring pressure and allow free spinning thereof.

Figure 1:
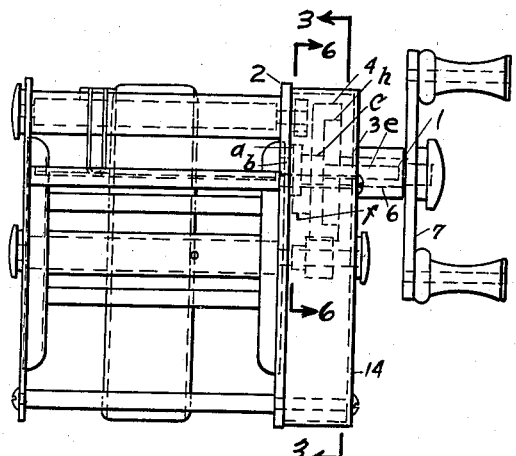
Fig. 1 is a side view of an assembled fishing reel head, showing the general arrangement of the external operating parts.
Figure 2:
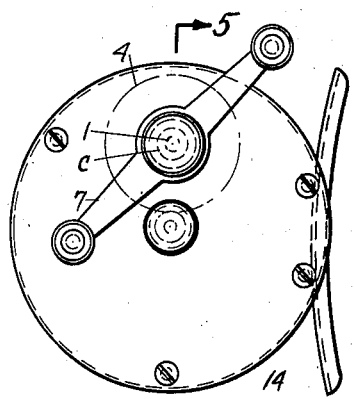
Fig. 2 is an end view of the fish reel head showing the relative position of the driving member and reel spool axis.
Figure 3:
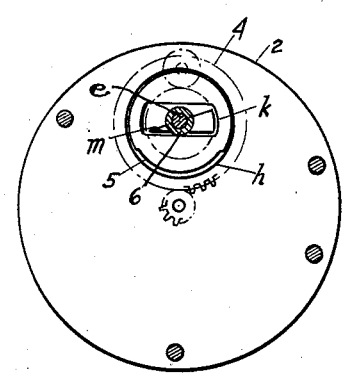
Fig. 3 is a cross-sectional view through the reel gear head, taken on the line 3—3 of the Fig. 1 with the head cap removed, showing the main spool driving gear with all of the locking units mounted therein.
Figure 4:
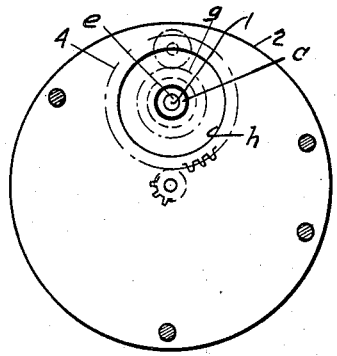
Fig. 4 is also a cross-sectional view taken on the same line 3—3 of Fig. 1 with the head cap removed showing the same main spool drive gear with all of the locking units removed therefrom, and the relative position of the floating gear mounting post.
Figure 5:
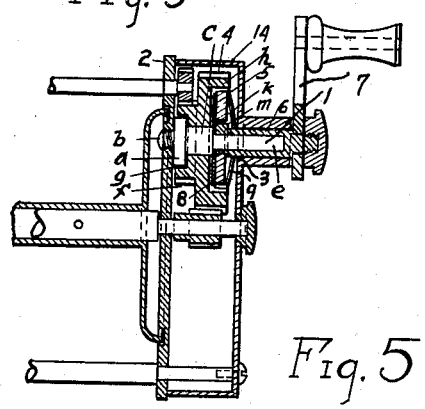
Fig. 5 is a longitudinal sectional view through the reel gear head taken on the line 5—5 of Fig. 2, showing the shouldered formation of the floating gear mounting post.
Figure 6:
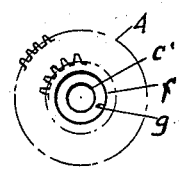
Fig. 6 is an elevation of the drive gear taken on the line 6—6 of Fig. 1, showing the gear bearing recess formed in the back side thereof.

Much difficulty has been experienced in the free spinning type of fishing reel, due to laggard gearing caused by undue friction resulting from external spring pressure of an inclosed locking unit spring. My floating gear mounting is especially adapted to relieve this and other similar conditions where gears or other rotatable members are mounted on the same shaft, subject to axially applied pressure.

In general, my floating gear mounting comprises shouldered shaft sections turned in stepped formation on a single shaft member, providing adjacent bearing and collar sections over which a recessed gear or rotatable member with special collar fittings are mounted.

I will now describe more fully the detailed construction of my device, referring to the drawings and the marks thereon.

In the fishing reel head as herein illustrated, the mounting 1 is shown as a stepped stud member fixedly mounted in the reel head plate 2, positioned at one side of the reel center axis, and at right angles to the head plate outer surface, said mounting 1 being projected out through a bearing opening 3 formed in the head cap 14. The mounting 1 is formed with an enlarged end collar $a$ designed to fit flat against the outer head plate surface, and is formed with an end projection $b$ for fixedly attaching same to the plate wall, either by thread or rivet means as shown, or by any other suitable means. The collar $a$ retains the mounting 1 in a rigid position on the supporting plate. Adjacent the collar section $a$ is formed a short stud shaft bearing section $c$ of lesser diameter than the collar, and concentric with the collar axis. Adjacent the stud shaft bearing section $c$ is formed an extended pivot shaft section $e$ of a still smaller diameter, less than the stud shaft bearing section, also concentric with the collar and bearing section axis. This stepped formation forms a solid mounting member of concentric cylindrical sections. Over the stud shaft bearing section $c$ is rotatably mounted a reel spool main drive gear 4. The gear 4 is formed with a shouldered projection $f$ on the bottom side thereof, either as a hub projection or an auxiliary operating gear, depending upon the type of fishing reel with which it is to be installed. The projection $f$ is formed with a cylindrical recess $g$ in the outer surface thereof, positioned concentric with the gear rotation axis, said recess being designed to receive and fit over the mounting collar $a$ and rotate freely thereon. The depth of the recess $g$ is limited to prevent contact between the gear projection $f$ and the reel head plate 2. The outer surface of the gear 4 is also formed with a recess $h$ herein shown as a design for receiving a special automatic locking disc 5 therein, said locking unit being more specifically described in Patent No. 2,028,629, or the recess may be used for any similar corresponding unit. In the unit herein shown, the lock disc 5 is a circular disc except that a portion of its boundry is a circumference of less diameter than the remainder of the disc, the two having a common center, the larger diameter disc section comprising slightly more than a half circle. The disc is loosely mounted within the recess h said disc being formed with a central eccentric wall opening k therethrough. Rotatably mounted over the pivot shaft section e is a special driving spindle 6 formed with an extended triangular lock hub projection m on the inner end thereof, designed to enter and engage the lower inner wall edge of the lock disc recess k upon rotation in the winding direction, displacing said lock disc 5 sufficiently to cause the two extremities of the large disc portion to engage the inclosing recess walls and lock the disc to the gear recess walls by friction and rotate the drive gear 4 therewith in the winding direction, but will release and allow free rotation of said gear for the opposite unwinding directional rotation by engaging the upper wall of the disc recess k, displacing the disc 5 to a free position when the turning handle 7 is reversed. The driving spindle 6 is projected through the bearing opening 3 of the reel head cap 14, and is provided with a turning handle 7 fixedly mounted thereon. A light curved tension spring washer 9 is placed over the lock disc 5, engaging the outer surface of the disc and the adjacent wall of the head cap 14, said tension spring washer being sufficiently stressed to cause a slight axial pressure on the lock disc surface. Beneath the lock disc 5 is mounted a thin washer shield 8 of a diameter smaller than the gear recess h to prevent contact with the recess walls, said washer shield 8 being formed with a central bearing concentric with the collar circumference and designed to fit over the pivot shaft section e and rest against the shouldered end of the stud shaft bearing section c. The depth of the bearing section c' in the gear 4, between the recesses g and h is made slightly less than the length of the stud shaft bearing section c, to prevent any frictional contact with the adjacent members. The washer shield 8 is designed to receive the lock spring pressure and prevent it from retarding the free rotation of the inclosing drive gear 4, yet provide means for effectively operating the locking unit within the gear for one directional rotation and allowing free spinning of the drive gear 4 when rotated in the opposite direction.

While I have herein illustrated my floating gear mounting as applied to a fishing reel drive gear effected by an inclosed locking disc and spring unit, it is to be understood that my invention is subject to various modifications in both design and arrangement of the various parts and application of the device to other similarly mounted rotatable members, and I not only claim the design herein shown and described, but any and all other designs and arrangements that are substantially a substitution of parts and sections herein shown.

Having fully described my floating gear mounting, what I claim as my invention and desire to secure by Letters Patent is:

1. A floating drive gear fishing reel comprising a combined frame and head plate and having a line reel spool with attached operating gear, rotatably mounted therein, a short stud shaft with outwardly extended central pivot section concentric therewith, fixedly mounted on the reel head plate at one side of the reel spool operating gear and parallel with the spool axis, a drive gear rotatably mounted on said stud shaft free to spin thereon and mesh with the reel spool operating gear, a thin washer shield mounted on the extended pivot section adjacent the stud shaft shoulder, and suitable gear driving mechanism rotatably mounted also on said extended pivot section adjacent said washer shield, designed to engage and rotate said drive gear in one direction of rotation only.

2. A floating drive gear fishing reel comprising a combined frame and head plate and having a line reel spool with attached operating gear, rotatably mounted axially therein, a short shouldered stud shaft with outwardly extended central pivot section concentric therewith, fixedly mounted on the reel head plate at one side of the reel operating gear parallel with the reel spool axis, a recessed drive gear rotatably mounted on said stud shaft free to spin thereon and mesh with the reel spool operating gear, a thin washer shield fixedly mounted on the extended pivot section adjacent the stud shaft shoulder, and suitable clutch gear driving mechanism rotatably mounted also on said extended pivot section adjacent said washer shield, designed to engage the gear recess and rotate said drive gear in one direction of rotation only.

3. A floating drive gear unit for a reel spool and attached operating gear, said reel spool being rotatably mounted within a suitable fishing reel frame with head plate, comprising a short stud shaft with outwardly extended central pivot section concentric therewith, fixedly mounted on the reel head plate at one side of the reel operating gear parallel to the reel spool axis, a drive gear rotatably mounted on said stud shaft free to spin thereon and mesh with the reel spool operating gear, a thin washer shield mounted on the extended pivot section adjacent the stud shaft shoulder, and suitable gear driving mechanism rotatably mounted also on the extended pivot section adjacent said washer shield, designed to engage and rotate said drive gear in one direction of rotation only.

4. A floating gear mounting for a reel spool driving gear, said reel spool with attached operating gear, being rotatably mounted in a suitable fishing reel frame with head plate, comprising a short stud shaft with outwardly extended central pivot section concentric therewith, fixedly mounted on said reel head plate at one side of the reel spool operating gear, positioned parallel to the reel spool axis, a drive gear rotatably mounted on said stud shaft for meshing with the reel spool operating gear, a thin washer shield mounted on said extended pivot section adjacent the stud shaft shoulder, a gear driving unit mounted on said extended pivot section designed to engage and rotate said drive gear in one direction of rotation only.

JOHN R. GEHR.